Figure 1:
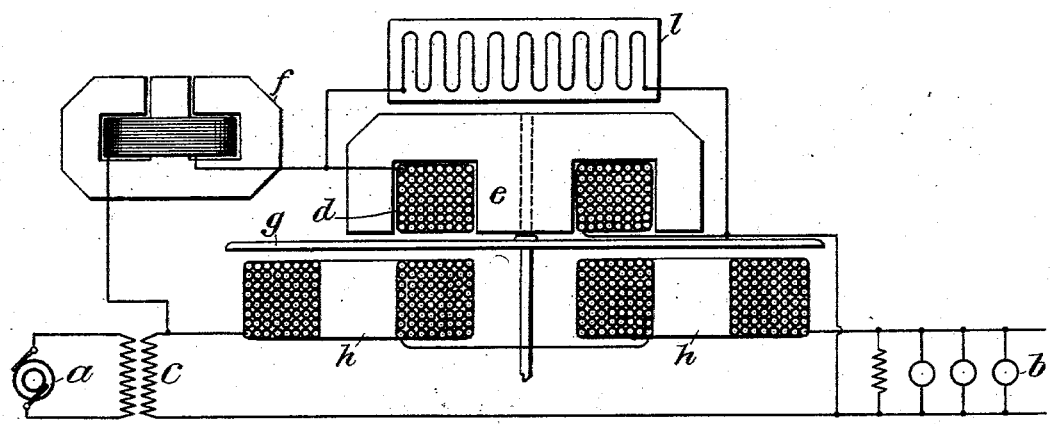

No. 757,518. PATENTED APR. 19, 1904.
E. M. TINGLEY.
METHOD OF PHASE ANGLE ADJUSTMENT.
APPLICATION FILED FEB. 4, 1901.

NO MODEL.

WITNESSES:
C. L. Belcher
Birney Hines

INVENTOR
Egbert M. Tingley
BY
Wesley G. Carr
ATTORNEY.

No. 757,518.   Patented April 19, 1904.

UNITED STATES PATENT OFFICE.

EGBERT M. TINGLEY, OF PITTSBURG, PENNSYLVANIA, ASSIGNOR TO WESTINGHOUSE ELECTRIC & MANUFACTURING COMPANY, A CORPORATION OF PENNSYLVANIA.

METHOD OF PHASE-ANGLE ADJUSTMENT.

SPECIFICATION forming part of Letters Patent No. 757,518, dated April 19, 1904.

Original application filed May 9, 1896, Serial No. 590,341. Divided and this application filed February 4, 1901. Serial No. 46,196.

(No model.)

*To all whom it may concern:*

Be it known that I, EGBERT M. TINGLEY, a citizen of the United States, residing at Pittsburg, in the county of Allegheny and State of Pennsylvania, have invented a new and useful Improvement in Methods of Phase-Angle Adjustment, of which the following is a specification, this application being a division of my application, Serial No. 590,841, filed May 9, 1896.

My invention relates to phase-angle adjustment, and more particularly to the adjustment of the phase angle between the shunt and series fields of instruments employed for measuring the energy consumed by translating devices in alternating-current circuits.

The object of my invention is to provide a method whereby such an adjustment of the phase relation between the magnetic fields of such an instrument may be effected as will insure an accurate indication of registration whatever may be the power factor of the work-circuit.

In alternating-current-measuring instruments the operation of which is dependent upon a difference in phase between the currents in the two actuating-coils or sets of coils—such, for example, as that shown in Patent No. 531,867, granted to O. B. Shallenberger January 1, 1895—it is necessary to have a phase difference of substantially ninety degrees between the shunt and series fields for a condition of no lag in the main work-circuit in order to secure a correct indication or registration of the true energy in circuits carrying the inductive loads having different power factors or in any given circuit the power factor of which is variable. This quadrature relation may be approximated in connection with single-phase circuits by the employment of a properly-designed inductance-coil in the shunt-circuit, as described in the said Shallenberger patent. In order to secure a phase angle of exactly ninety degees, however, an additional correcting or adjusting means is usually necessary. Such a means is set forth in Patent No. 548,231, granted to O. B. Shallenberger October 22, 1895. It consists of a closed-coil secondary located in the field of the main shunt-coil and having its magnetic circuit coincident with that of said shunt-coil, by virtue of which a component is added to the field of the shunt-coil which serves to give the desired phase-angle.

I propose to secure the desired phase angle between the shunt and series field when there is no current lag in the work-circuit by displacing the current in the shunt field-coil with reference to that in the series field coil or coils, such displacement being a retardation of a sufficient amount to produce a phase angle of substantially ninety degrees between the current in the shunt-coil and that in the series coil for a condition of no lag in the work-circuit. The means for effecting the desired result comprises a non-inductive shunt to the field coil or coils—*i. e.*, a shunt having a lesser time constant than that of the coil or coils shunted—it being of course understood that the non-inductive resistance included in the shunt will be so proportioned as to coöperate with the main field coil or coils in connection with which it is used.

Figure 2:
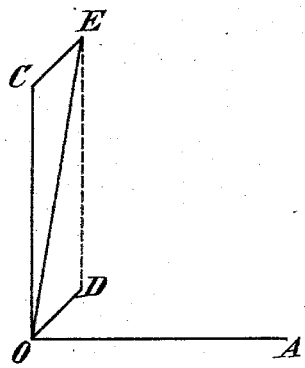

Reference being now had to the accompanying drawings, Figure 1 is a diagram of a single-phase circuit and a wattmeter constructed in accordance with my invention. Fig. 2 is a diagram representing the various currents and phase angles involved in the apparatus illustrated in Fig. 1.

Reference being now had to Fig. 1 of the drawings, $a$ is an alternating-current generator for supplying energy to the translating devices $b$, either directly or through a transformer $c$.

$d$ is one of the actuating-coils of the meter provided with a magnetic core $e$ and connected across the work-circuit. The circuit of this coil $d$ includes an inductance-coil $f$ in order to retard the shunt-current with reference to the impressed electromotive force.

$g$ is the rotatable armature of the meter, which is preferably in the form of a disk, as indicated.

$h$ $h$ are two coils connected in series in the work-circuit and located on the opposite side of the disk from the coil $d$. While two of these coils are shown, a single coil may be employed, if desired, provided it is properly located with reference to the coil $d$.

The construction thus far described when employed in connection with the necessary registering or indicating and retarding devices is suitable for determining the amount of electrical energy consumed in the work-circuit, provided there is substantially no inductive load on such circuit. It is found to be practically impossible, however, to produce the ninety-degree relation between the impressed electromotive force and the current in the shunt-coil of the meter that is desired in order to secure accurate indication or registration for different inductive loads without the employment of some additional phase-adjusting means. Such a means is shown in Fig. 1 and comprises a non-inductive resistance $l$ in shunt to the coil $d$. The non-inductive shunt $l$ is of such proportions as to provide a component that is leading with reference to the main shunt-current, and it therefore serves to retard the current in the coil $d$ the necessary amount to provide the desired quadrature relation between the said current and that in the series coils $h$, as is indicated diagrammatically in Fig. 2, in which line O A represents at a given instant the current in the series coils of the meter, line O E the main shunt-current, line C E, which is equal and parallel to line O D, the current in the non-inductive shunt $l$, and line O C the current in the shunt-coil of the meter. The angle A O C is the phase angle between the current in the shunt-coil and the current in the series coils, this angle being ninety degrees, as desired, the angle C O E being the angle of compensation.

The correct proportions of the coils will obviously depend upon the conditions to be met in any particular case and may readily be determined by any one skilled in the art.

While my invention is illustrated and described in connection with an instrument for measuring electrical energy and is primarily intended for use in such relations, I do not desire or intend to limit my invention to this particular use.

I claim as my invention—

1. The method of producing a desired phase angle between two magnetic fields which consists in lagging the current in one of the field-producing coils by introducing inductive resistance directly into the circuit and shunting said coil by a non-inductive resistance.

2. The method of increasing the phase angle between the currents in two independent field-coils which consists in shunting one of said coils by a resistance having a lesser time constant than said coil.

3. The method of producing a desired phase angle between two magnetic fields which consists in lagging the current in one of the field-producing coils by introducing inductive resistance directly into its circuit and causing a further lag by shunting said coil by a resistance having a lesser time constant than the coil.

4. The method of producing a quadrature relation between two current-circuits, which consists in shunting a circuit carrying a monophase current thereby producing a shunt-circuit, effecting a lag of the phase of the current therein and producing a further lag of the current phase of the shunt-circuit by shunting the same by a resistance having a different time constant from that of the shunt.

5. The method of producing a quadrature relation between currents flowing in two coils, which consists in lagging the phase of the current in one of the said coils and shunting the said coil by non-inductive resistance which will produce a further lag in the current phase of the said coil.

In testimony whereof I have hereunto subscribed my name this 31st day of January, 1901.

EGBERT M. TINGLEY.

Witnesses:
 WESLEY G. CARR,
 BIRNEY HINES.